(12) United States Patent
Hasler et al.

(10) Patent No.: US 9,866,109 B2
(45) Date of Patent: Jan. 9, 2018

(54) METHODS AND DEVICES FOR POWER COMPENSATION

(71) Applicant: ABB TECHNOLOGY LTD, Zürich (CH)

(72) Inventors: Jean-Philippe Hasler, Västerås (SE); Marcio De Oliveira, Sao Paulo (BR)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/903,245

(22) PCT Filed: Jul. 19, 2013

(86) PCT No.: PCT/EP2013/065255
§ 371 (c)(1),
(2) Date: Jan. 6, 2016

(87) PCT Pub. No.: WO2015/007330
PCT Pub. Date: Jan. 22, 2015

(65) Prior Publication Data
US 2016/0149481 A1    May 26, 2016

(51) Int. Cl.
*H02M 1/42* (2007.01)
*H02J 3/16* (2006.01)
(Continued)

(52) U.S. Cl.
CPC ............. *H02M 1/4208* (2013.01); *H02J 3/16* (2013.01); *H02J 3/1857* (2013.01);
(Continued)

(58) Field of Classification Search
CPC .... H02M 1/42; H02M 1/4216; H02M 1/4208; H02M 1/4225; H02M 1/4233;
(Continued)

(56) References Cited

U.S. PATENT DOCUMENTS 5,402,058 A * 3/1995 Larsen ................. H02J 3/1864
                                                 323/210
7,692,415 B2 * 4/2010 Yasuda ..................... G05F 1/70
                                                 307/105
(Continued)

FOREIGN PATENT DOCUMENTS

CN       2888715 Y     4/2007
CN       1976162 A     6/2007
(Continued)

OTHER PUBLICATIONS

English machine translation of CN-201450340-U of Yang et al. published May 5, 2010.
(Continued)

*Primary Examiner* — Timothy J Dole
*Assistant Examiner* — Carlos Rivera-Perez
(74) *Attorney, Agent, or Firm* — Birch, Stewart, Kolasch & Birch, LLP

(57) ABSTRACT

A method is performed in a control device for controlling a power compensation arrangement including a voltage source converter and one or more power compensation branches, each power compensation branch including a thyristor controlled reactor, a thyristor switched reactor or a thyristor controlled capacitor. The voltage source converter and the one or more power compensation branches are connected to a same busbar. The method includes: detecting a request in an electrical power system to which the power compensation arrangement is connected; determining, based on the request, a need for reactive power supply to the electrical power system; providing reactive power by means of the voltage source converter and/or by one or more of the power compensation branches; and compensating, by means of the voltage source converter, any disturbances caused by the power compensation branches when providing the reac-
(Continued)

tive power to the electrical power system. Corresponding devices are also disclosed.

15 Claims, 3 Drawing Sheets

(51) Int. Cl.
*H02J 3/18* (2006.01)
*H02J 3/26* (2006.01)

(52) U.S. Cl.
CPC .............. *H02J 3/1864* (2013.01); *H02J 3/26* (2013.01); *Y02E 40/12* (2013.01); *Y02E 40/26* (2013.01); *Y02E 40/34* (2013.01); *Y02E 40/50* (2013.01)

(58) Field of Classification Search
CPC .. H02M 1/4241; H02M 1/425; H02M 1/4258; H02M 1/4266; H02M 1/44; H02M 1/32; H02M 1/34; H02M 1/12; H02M 1/126; H02M 1/14; H02M 1/143; H02M 1/15; H02M 7/483; H02M 7/4835; H02M 7/487; H02M 7/49; H02M 2001/342; H02M 2001/344; H02M 2001/346; H02M 2001/348; H02M 2001/123; H02J 3/16; H02J 3/1857; H02J 3/1864; H02J 3/26; Y02E 40/12; Y02E 40/26; Y02E 40/34; Y02E 40/50; Y02B 70/12; Y02B 70/123; Y02B 70/126
USPC ........ 323/205–211, 271–277, 282–286, 351; 363/16–21.03, 34, 35, 37–47; 327/551–559; 307/105
See application file for complete search history.

(56) References Cited

U.S. PATENT DOCUMENTS

| 2008/0001581 | A1* | 1/2008 | Takeda ...................... G05F 1/70 323/210 |
|---|---|---|---|
| 2010/0109616 | A1* | 5/2010 | Li ............................. G05F 1/70 323/210 |
| 2011/0181044 | A1 | 7/2011 | Scott et al. |

FOREIGN PATENT DOCUMENTS

| CN | 101420128 A | 4/2009 |
|---|---|---|
| CN | 201450340 U | 5/2010 |
| CN | 201774259 U | 3/2011 |
| CN | 101335456 B | 6/2011 |
| CN | 201868882 U | 6/2011 |
| CN | 201994670 U | 9/2011 |
| CN | 102354979 A | 2/2012 |
| SE | 1100308 A1 | 5/2011 |
| WO | WO 2008/141963 A2 | 11/2008 |

OTHER PUBLICATIONS

Cetin et al., "VSC-Based D-STATCOM with Selective Harmonic Elimination," IEEE Transactions on Industry Applications, vol. 45, No. 3, May/Jun. 2009, pp. 1000-1015.
Dixon et al., "Reactive Power Compensation Technologies: State-of-the-Art Review," Proceedings of the IEEE, vol. 93, No. 12, Dec. 2005, pp. 2144-2164.
El-Moursi et al., "Novel Controllers for the 48-Pulse VSC STATCOM and SSSC for Voltage Regulation and Reactive Power Compensation," IEEE Transactions on Power Systems, vol. 20, No. 4, Nov. 2005, pp. 1985-1997.
Junling et al., "A Novel Combined System Using Cascaded Active Power Filter and Static Var Compensator for High-power Applications," International Conference on Computer Distributed Control and Intelligent Environmental Monitoring, 2011, pp. 664-667.
Kanetkar et al., "Harmonic Elimination in Voltage Source Converters using Parallel Converter With Zero Active Power," IEEE Catalogue No. 95TH8025, 1995, pp. 577-582.
Kulkarni et al., "Optimum Switching of TSC-TCR Using GA Trained ANN for Minimum Harmonic Injection," Second International Conference on Emerging Trends in Engineering and Technology, ICETET-09, 2009, pp. 527-532.
Torseng, "Shunt-connected reactors and capacitors controlled by thyristors," Reactive Compensation, 1980, pp. 1-8.
Tyll et al., "Historical overview on dynamic reactive power compensation solutions from the begin of AC power transmission towards present applications," IEEE, 2009, pp. 1-7.

* cited by examiner

METHODS AND DEVICES FOR POWER COMPENSATION

TECHNICAL FIELD

The technology disclosed herein relates generally to the field of electrical power systems, and in particular to reactive power compensation within such systems.

BACKGROUND

Reactive power compensators are used for voltage control, reactive/active power flow control, transient and steady-state stabilization for improving the operation and functionality of e.g. electrical power transmission and distribution systems.

Thyristor Controlled Reactors (TCRs)/Thyristor Switched Reactors (TSRs) and Thyristor Switched Capacitors (TSCs) have been widely used as inductive and capacitive reactive power branches of Static Var Compensators (SVCs), respectively.

A drawback of the TCR is the amount of harmonics, e.g. $5^{th}$, $7^{th}$, $11^{th}$, $13^{th}$, . . . , etc. harmonics, that it generates during steady state operation and also, during unbalanced network voltage, harmonics of $3^{rd}$, $9^{th}$, . . . etc. order. For the TCR, harmonic filter branches are normally required in order to reduce the harmonic emission to reach performance levels specified by the network operator. Such filter branches are expensive and require large footprint, e.g. in a substation where they are typically placed.

The TSR does not generate low order harmonics, but a drawback of the TSR is that it creates large current transients in the feeding network when switched in or out, causing voltage disturbances. In order to minimize the voltage transients from the TSR, it is often necessary to divide the TSR in smaller sizes and/or use it together with TSC.

The TSC comprises capacitor banks requiring large footprint, and energizing transients of the capacitor banks have to be taken care of. In particular, energizing a second capacitor bank when a first capacitor bank is already energized, i.e. back-to-back switching, requires the frequency and amplitude of voltage oscillations on a busbar to be limited in order not to generate overvoltages.

Nowadays, it is a trend to replace these branches by Voltage Source Converter (VSC) based chain-link technology. The chain-link technology of the VSC is however rather costly to implement, mainly since it entails advanced power electronics switching devices and advanced control technology.

The various power compensation devices thus have their advantages as well as drawbacks and while high performance can be obtained, it comes with high costs, both initial costs and maintenance costs.

SUMMARY

An object of the present teachings is to address the above by providing a power compensation arrangement having balanced cost versus performance.

The object is according to a first aspect achieved by a method performed in a control device for controlling a power compensation arrangement comprising a voltage source converter and one or more power compensation branches. Each power compensation branch comprises a thyristor controlled reactor, a thyristor switched reactor or a thyristor controlled capacitor. The voltage source and the one or more power compensation branches are connected to a same busbar. The method comprises: detecting a request in an electrical power system to which the power compensation arrangement is connected; determining, based on the request, a need for reactive power supply to the electrical power system; providing reactive power by means of the voltage source converter and/or by one or more of the power compensation branches; and compensating, by means of the voltage source converter, any disturbances caused by the power compensation branches when providing the reactive power to the electrical power system.

The method for controlling the power compensation arrangement provides the benefits of the voltage source converter, while enabling reduced costs by also taking advantage of the less expensive thyristor controlled reactors, thyristor switched reactors and/or thyristor switched capacitors.

The object is according to a second aspect achieved by a control device for controlling a power compensation arrangement. The power compensation arrangement comprises a voltage source converter and one or more power compensation branches, each power compensation branch comprising a thyristor controlled reactor, a thyristor switched reactor or a thyristor controlled capacitor. The voltage source converter and the one or more power compensation branches are connected to a same busbar. The control device is configured to: detect a request in an electrical power system to which the power compensation arrangement is connected; determine, based on the request, a need for reactive power supply to the electrical power system; provide reactive power by means of the voltage source converter and/or by one or more of the power compensation branches; and compensate, by means of the voltage source converter, any disturbances caused by the power compensation branches when providing the reactive power to the electrical power system.

Advantages corresponding to the above are obtained also by the control device.

The object is according to a third aspect achieved by a computer program for a control device configured to control a power compensation arrangement comprising a voltage source converter and one or more power compensation branches, wherein each power compensation branch comprising a thyristor controlled reactor, a thyristor switched reactor or a thyristor controlled capacitor. The voltage source converter and the one or more power compensation branches are connected to a same busbar. The computer program comprises computer program code, which, when run on the control device causes the control device to: detect a request in an electrical power system to which the power compensation arrangement is connected; determine, based on the request, a need for reactive power supply to the electrical power system; provide reactive power by means of the voltage source converter and/or by one or more of the power compensation branches; and compensate, by means of the voltage source converter, any disturbances caused by the power compensation branches when providing the reactive power to the electrical power system.

Advantages corresponding to the above are obtained also by the computer program.

The object is according to a fourth aspect achieved by a computer program product comprising a computer program as above, and a computer readable means on which the computer program is stored.

Advantages corresponding to the above are obtained also by the computer program product.

Further features and advantages of the present teachings will become clear upon reading the following description and the accompanying drawings.

DETAILED DESCRIPTION

Figure 1:
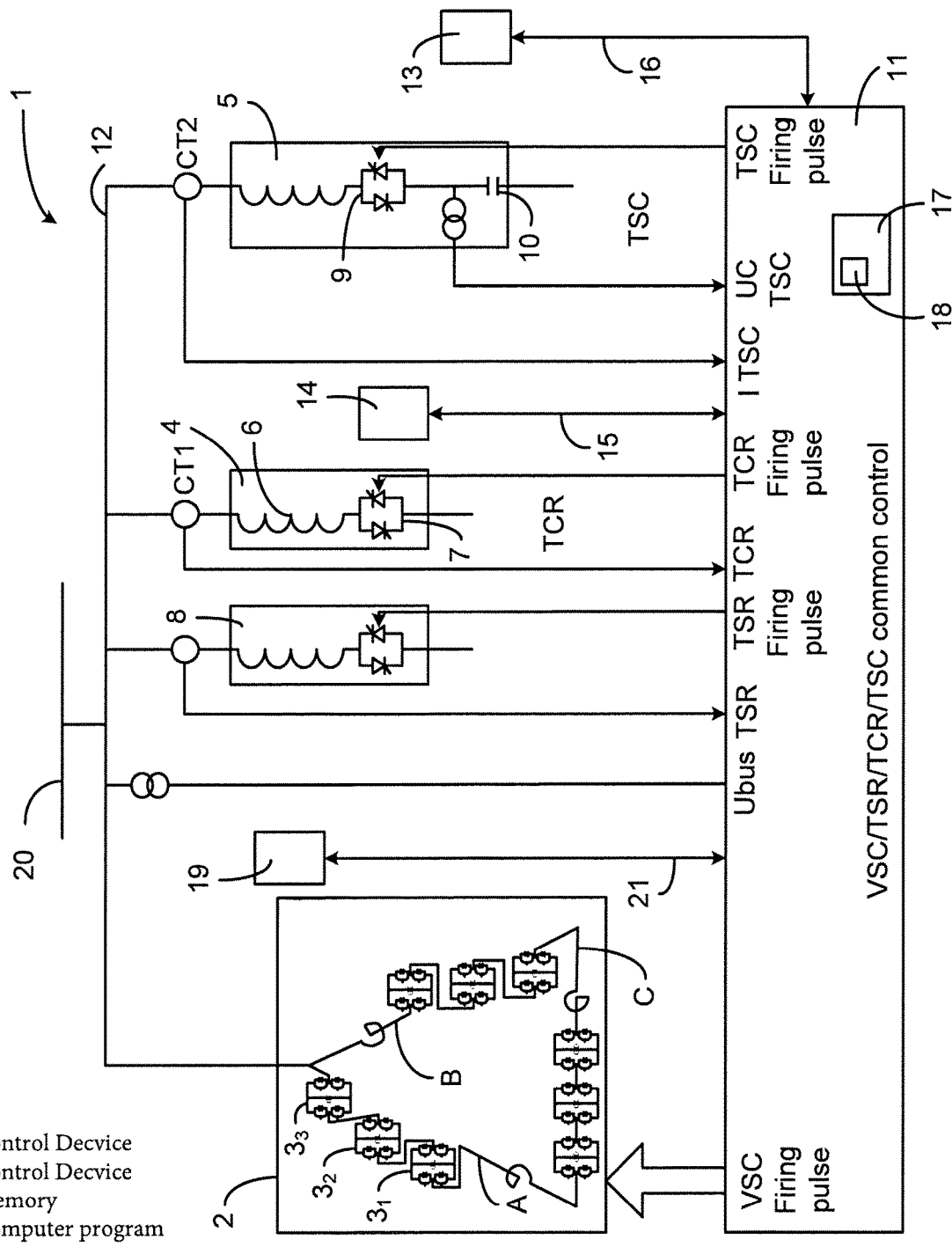
FIG. 1 illustrates an embodiment of a power compensation arrangement according to the present teachings.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

FIG. 1 illustrates an embodiment of a power compensation arrangement according to the present teachings. The power compensation arrangement 1 comprises a voltage source converter 2 (VSC) based on chain-link technology. A three-phase chain-link converter comprises three phase legs, where each phase leg comprises a number of series-connected chain-link modules. The VSC 2 comprises three such phase-legs A, B, C, each phase leg thus comprising a number of series-connected chain-link modules, in the following denoted converter cells, e.g. converter cells $3_1, 3_2, \ldots, 3_n$ of phase leg A. Such converter cells $3_1, 3_2, \ldots, 3_n$ are also denoted switching cells and the particular layout of the converter cells is not important for the present teachings. For example, each converter cell $3_1, 3_2, \ldots, 3_n$ may comprise four valves connected in an H-bridge arrangement with a capacitor unit (often denoted full-bridge converter cell). Each valve in turn may comprise a transistor switch, such as an IGBT (Insulated Gate Bipolar Transistor), having a free-wheeling diode connected in parallel thereto. It is noted that other semiconductor devices could be used, e.g. gate turn-off thyristors (GTO) or Integrated Gate-Commutated Thyristors (IGCT). The converter cells $3_1, 3_2, \ldots, 3_n$ could alternatively comprise half-bridge converter cells, and it is noted that yet other converter topologies could benefit from the present teachings. The other phase legs B, C also comprise such series-connected converter cells.

In the figure, the phase legs A, B, C comprising the series-connected converter cells are connected in a delta configuration. In other embodiment, the phase legs are connected in a wye-configuration.

In the embodiment illustrated in FIG. 1, the power compensation arrangement 1 further comprises three other power compensating branches. In particular, the power compensation arrangement 1 comprises a first branch comprising a thyristor controller reactor (TCR) 4, a second branch comprising a thyristor switched reactor (TSR) 8 and a third branch comprising a thyristor switched capacitor (TSC) 5.

Both a TCR and a TSR comprises, for each phase, a thyristor 7 controlled inductor 6. A difference between a TCR and a TSR is that the reactance of the TCR can be varied in a continuous manner by partial-conduction control of the thyristor 7 value, while the reactance of the TSR can be varied in a step-wise manner by full- or zero conduction operation of the thyristor value.

As was mentioned in the background section, a TCR typically require a filter device for handling harmonics. For example, a filter circuit comprising capacitor and series reactance, tuned to a particular harmonic frequency, which is to be filtered out. It is noted that in accordance with the present teachings, such filter device may be omitted by instead handling the harmonics created when switching in the TCR 4 by the VSC 2, as will be described later.

The TSC 5 comprises a thyristor 9 switched capacitor 10, which may comprise a single capacitor, but typically comprises a bank of capacitors. The reactance of the TSC 5 can be varied in a stepwise manner by full- or zero conduction operation of the thyristor value.

The power compensation arrangement 1 may be connected to an electrical power system or electrical power network or to an electrical load, e.g. an industrial load. Such electrical power system is schematically indicated at reference numeral 20, and it is noted that various devices (not illustrated), such as transformers, are typically placed between the power compensation arrangement 1 and the electrical power system 20 to which it is to be connected.

The VSC 2 and the one or more branches of the power compensation arrangement 1, i.e. the one or more branches comprising a TCR 4, one or more branches comprising a TSR 8 and the one or more branches comprising a TSC 5 are connected to a common busbar 12.

Figure 2:
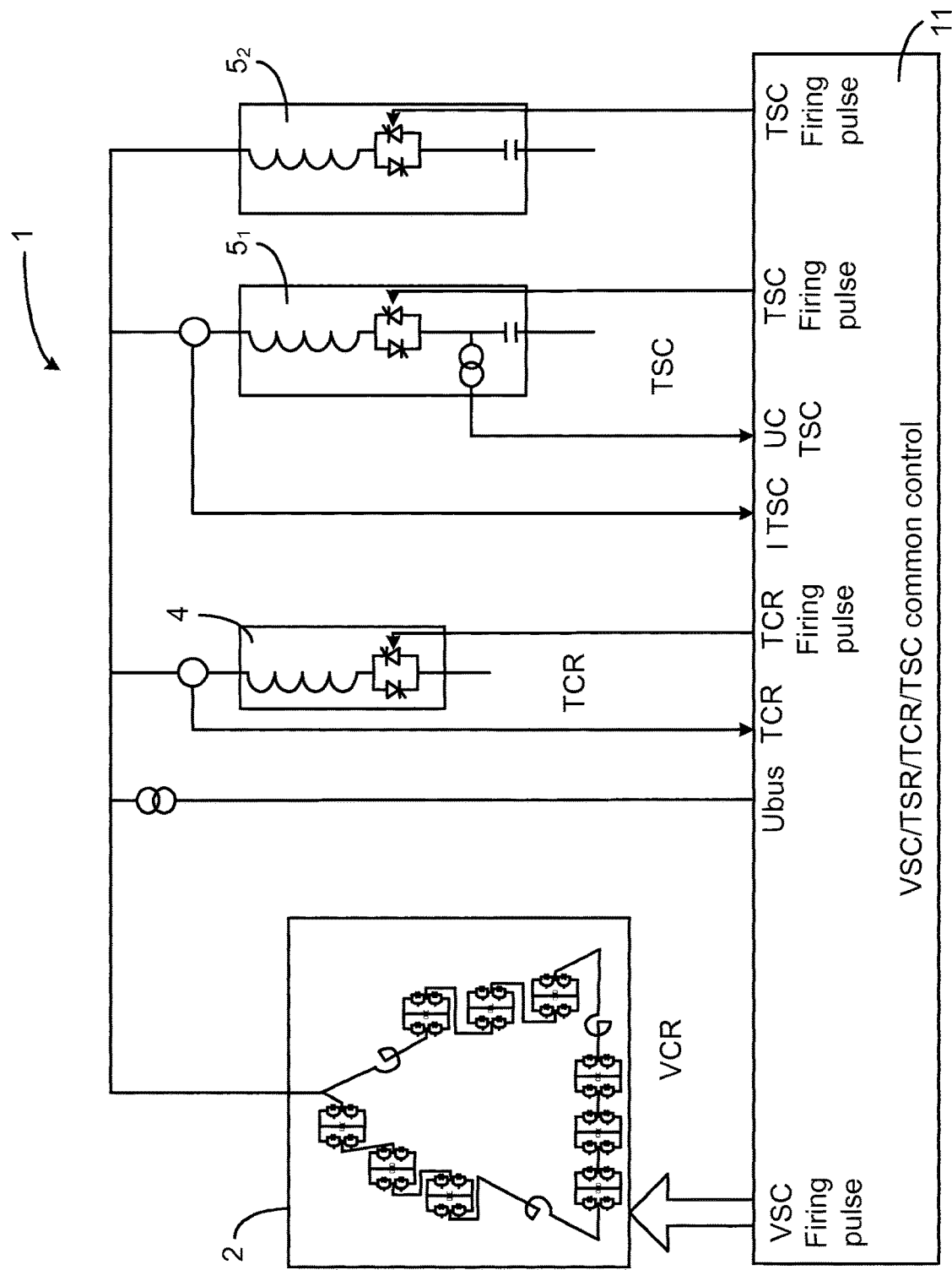
FIG. 2 illustrates another embodiment of a power compensation arrangement according to the present teachings.

The power compensation arrangement 1 of the present teachings may be adapted in dependence on the needs of the particular application at hand. In particular, the power compensation arrangement 1 comprises the VSC 2 and one or more of power compensation branches 4, 5, 8. Each of the power compensation branches 4, 5, 8 may comprises a TCR 4, TSR 8 and/or a TSC 5, and all power compensation branches 4, 5, 8 are connected to the one and same bus bar 12. In one embodiment thus (not illustrated), the power compensation arrangement 1 comprises the VSC 2 and the TCR 4. In another embodiment (not illustrated), the power compensation arrangement 1 comprises the VSC 2 and the TSC 5. In yet another embodiment (not illustrated), the power compensation arrangement 1 comprises the VSC 2 and the TSR 8. In still other embodiments, the power compensation arrangement 1 comprises the VSC 2 and two or more branches of TCR 4 and/or TSR 8, and/or two or more branches of TSC 5. FIG. 2 exemplifies one of the various possible embodiments of a power compensation arrangement 1 according to the present teachings. In particular, the power compensation arrangement 1 of FIG. 2 comprises the VSC 2, the TCR 4 and two branches of TSC 5: $TSC\ 5_1$ and $TSC\ 5_2$. The teachings of the present application thus encompass any combination of VSC 2 and one or more of TCR 4, TSR 8 and TSC 5.

The power compensation arrangement 1 is controlled by a common control system, which common control system is used to control the TCR 4, the TSR 8, the TSC 5 and the VSC 2. In particular, in an embodiment a control device 11 is configured to control all the branches 4, 5, 8 of the power compensation arrangement 1. In other embodiments, several control devices 11, 13, 14 are utilized. The control device 11 may comprise a processor using any combination of one or more of a suitable central processing unit (CPU), multiprocessor, microcontroller, digital signal processor (DSP), application specific integrated circuit etc., capable of executing software instructions stored in a memory 17, which can thus be a computer program product. The control device 11 can be configured to execute various embodiments of a method, to be described next, for controlling the power compensation arrangement 1.

Figure 3:
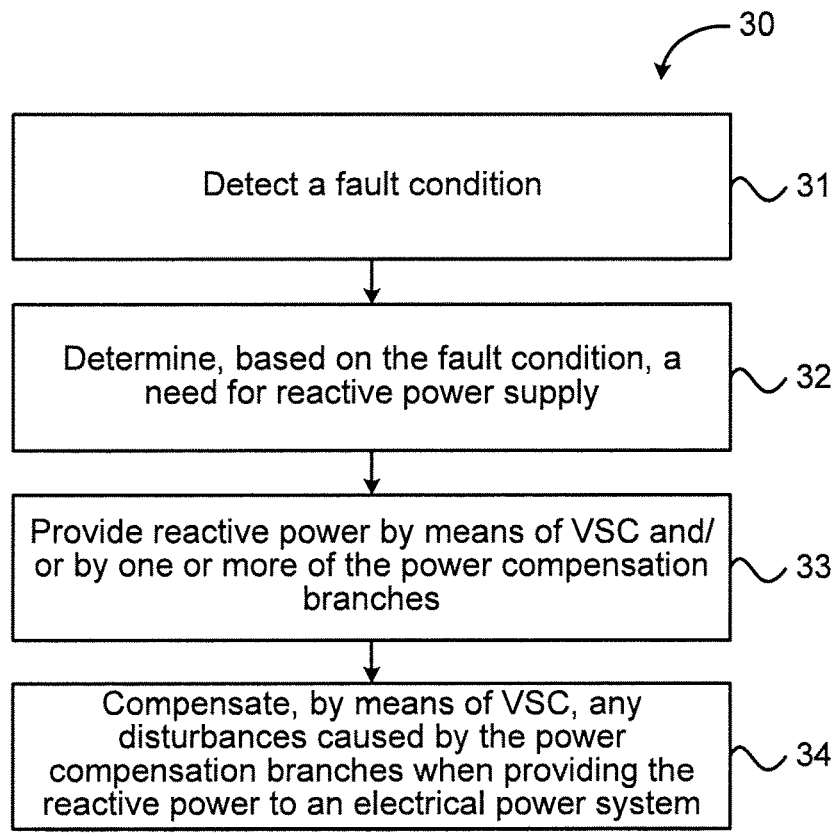
FIG. 3 is a flow chart over steps of a method according to the present teachings.

FIG. 3 is a flow chart over steps of a method according to the present teachings. The method 30 may be performed in a control device 11 for controlling a power compensation arrangement 1 as described. In particular, for controlling a power compensation arrangement 1 comprising a voltage source converter 2 and one or more power compensation branches 4, 5, 8, wherein each power compensation branch 4, 5, 8 comprises a thyristor controlled reactor, a thyristor switched reactor or a thyristor controlled capacitor. The voltage source converter 2 and the one or more power compensation branches 4, 5, 8 are connected to a same busbar 12.

The method 30 comprises detecting 31 a request in an electrical power system 20 to which the power compensation arrangement 1 is connected. The power compensation arrangement 1 is typically connected to an electrical power network 20 in order to handle unbalanced network conditions occurring in the electrical power network 20. The request may for example comprise a fault condition, a request from a voltage control, a request from a reactive power control, a request from an operator of the electrical power system or a request based on changes in the electrical power system.

The detecting 31 of a request, when it comprises a fault condition, may be done in any conventional manner, for example by measuring certain voltages and/or currents, comparing them to desired values (target values) and when detecting a deviating measured value a fault condition is detected.

When the request comprises a request from a control device, such as a voltage control or a reactive power control, the detecting 31 of a request may then comprise detecting a signal indicating a system voltage condition not being equal to a reference value. The change in reactive power output of the power compensation arrangement 1 may thus be ordered e.g. by a voltage control device to maintain the electrical power system voltage at a reference value. Correspondingly, when the request comprises a request from the operator of the electrical power system, or when it is based on changes in the electrical power system, the detecting of the request may then comprise receiving a signal indicating such respective request. For example, an operator may enter a request to increase/decrease the reactive power out of the power compensation arrangement 1 e.g. by means of a keyboard, and the control device 11 may thus receive a corresponding signal and effectuate the request by the operator.

The method 30 further comprises determining 32, based on the request, a need for reactive power supply to the electrical power system 20. The determining 32 a need for reactive power can also be done in any conventional manner, e.g. by detecting a fault condition and calculating amount of reactive power supply needed to remove the fault condition.

The method 30 further comprises providing 33 reactive power by means of the voltage source converter 2 and/or by one or more of the power compensation branches 4, 5, 8. In some cases only the voltage source converter 2 is needed as power compensation source, and in some cases additional power compensation may be required, e.g. if the capacity limit of the VSC 2 has been reached. In an embodiment, in case the VSC 2 is unable to provide the reactive power needed, then one or more of the power compensation branches 4, 5, 8 is switched in, providing the additional reactive power that is needed. In other cases, additional power compensation may be required in order to minimize the losses of the power compensation arrangement 1. That is, the power compensation branches 4, 5, 8 may be switched in or out when the voltage source converter 2 reaches its limits or they can be switched in or out in order to minimize losses of the power compensation arrangement 1.

The method 30 further comprises compensating 34, by means of the voltage source converter 2, any disturbances caused by the power compensation branches 4, 5, 8 when providing the reactive power to the electrical power system 20. The VSC 2 is thus used for compensating for any disturbances, e.g. harmonics or current transients that may occur when switching in one of the power compensation branches 4, 5, 8.

In an embodiment thus, the determining 32 the need for reactive power supply to the electrical power system 20 is determined to be larger than a reactive power capacity of the voltage source converter 2. That is, the reactive power need of the electrical power system 20 is larger than what the VSC 2 is able to provide. The providing 33 of reactive power then comprises using one or more of the power compensation branches 4, 5, 8 in addition to the voltage source converter 2.

In an embodiment, the power compensation branch comprises a thyristor controlled reactor 4 and the compensating 34 of disturbances comprises:
  measuring a current $I_{TCR}$ from the thyristor controlled reactor 4, and
  compensating, based on the measured current $I_{TCR}$, harmonics caused by the thyristor controlled reactor 4.

The TCR 4 current $I_{TCR}$ (see FIG. 1) may be measured by means of e.g. a current transformer CT1 (see FIG. 1) or by means of a transducer. The current response may then be used so as to control the VSC 2 to compensate for harmonics generated by the TCR 4. When the electrical power network 20 shows unbalanced network conditions, the TCR 4 current unbalance and corresponding uncharacteristic harmonics may also be compensated for by the VSC 2.

In an embodiment, the power compensation branch comprises a thyristor switched reactor 8 and the compensating 34 of disturbances comprises:
  measuring a current $I_{TSR}$ from the thyristor switched reactor 8, and
  compensating, based on the measured current $I_{TSR}$, current transients caused by the thyristor switched reactor 8.

When switching the TSR 8 in and out, the TSR 8 current $I_{TSR}$ (see FIG. 1) comprises a positive-sequence component and a negative-sequence component, causing voltage steps and voltage unbalance in the electrical power network 20. In such case, the measured TSR 8 current $I_{TSR}$ may be used as reference current to the control device 11 so as to minimize current transients.

In an embodiment, the power compensation branch comprises a thyristor switched capacitor 5 and the compensating 34 of disturbances comprises:
  measuring a current $I_{TSC}$ and voltage $U_{C\_TSC}$ of the thyristor switched capacitor 5, and a bus 12 voltage $U_{bus}$,
  predicting a thyristor switched capacitor 5 current, based on the measured current $I_{TSC}$ and voltages $U_{C\_TSC}$, $U_{bus}$, and based on a switching time instance giving a minimal voltage $U_{C\_TSC}$ of the thyristor switched capacitor 5, and
  compensating, based on the predicted thyristor switched capacitor 5 current, for the sum of transient currents of the thyristor switched capacitor 5 and the voltage source converter 2.

For the case of the power compensation arrangement 1 comprising the TSC 5, the TSC 5 current $I_{TSC}$ (see FIG. 1), the TSC capacitor voltage $U_{C\_TSC}$ (see FIG. 1) and the bus voltage $U_{bus}$ (see FIG. 1) may be measured in order to predict the TSC 4 current when switched in. The predicted current is then used by the control device 11 so as to control the VSC 2 to minimize the transient current summation of the TSC 5 and VSC 2, thus reducing the disturbance to the electrical power network 20 caused by switching in the thyristor switched capacitor 5.

In an embodiment, the providing 32 of reactive power comprises a sub-step of determining availability of the power compensation branches 4, 5, 8 and providing the reactive power based on the determination. Certain power compensation branches may for example be unavailable, and the determination may be done by identifying if there are any switches (e.g. circuit breakers) open, which would identify the corresponding power compensation branch to be unavailable.

As mentioned earlier, a common control system is provided controlling the power compensation arrangement 1. The common control system may comprise the control device 11 or a combination of the control device 11 and additional control devices, e.g. control devices 13, 14 and 19, wherein each additional control device is configured to control a respective branch, or several branches. In a particular embodiment, illustrated in FIG. 1, the common control system comprises the control device 11 and a second control device 13, a third control device 14 and a fourth control device 19. The second control device 13, the third control device 14 and the fourth control device 19 have communication means 15, 16, and 21 respectively, to communicate control signaling to the control device 11 and receive control signaling from the control device 11. The communication means 15, 16, 21 may comprise wired or wireless communication means, such as for example fiber optic cables or Ethernet. The second control device 13 is configured to provide signaling, e.g. control signals, to the control device 11 that relates to the branch to which it is related, i.e. the branch comprising the TCR 4. The third control device 14 is configured to provide signaling, e.g. control signals, to the control device 11 that relates to the branch to which it is related, i.e. the branch comprising the TSC 5. The fourth control device 19 is configured to provide signaling, e.g. control signals, to the control device 11 that relates to the branch to which it is related, i.e. the branch comprising the TSR 8.

Figure 4:
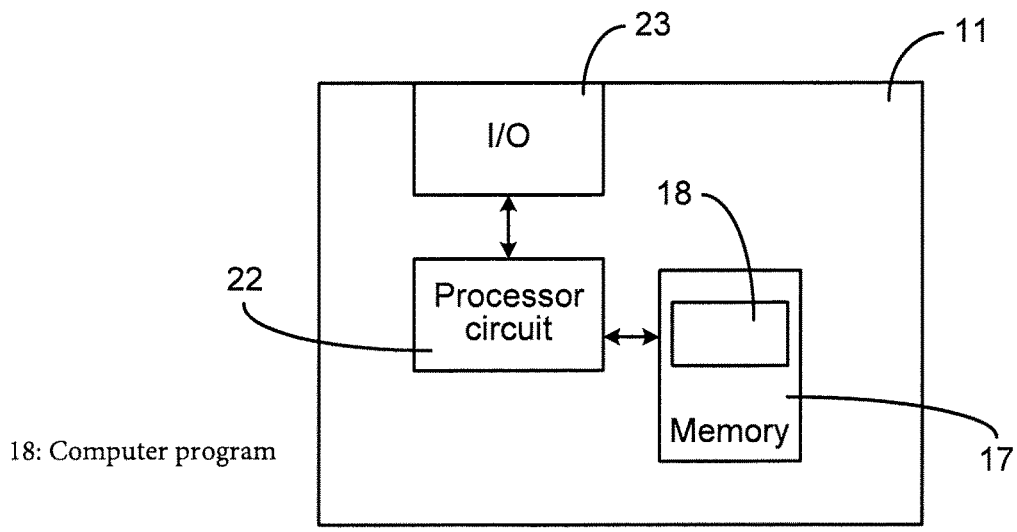
FIG. 4 illustrates a control device according to the present teachings.

FIG. 4 illustrates a control device 11 according to the present teachings. The control device 11 (refer also to FIG. 1) comprises an input/output (I/O) device 23 for receiving e.g. control signaling from the second, third and fourth control devices 13, 14, 19, and measurement values for measurements made in e.g. one of the power compensation branches (if such values are not conveyed via the respective control device) or measurements made in the electrical power system 20 to which the power compensation arrangement 1 is connected. It is noted that although the I/O device 23 is illustrated as a single device, it could comprise several devices. The control device 11 further comprises one or more processor circuits 22 and memory 17. The memory 17 contains instructions executable by the processor circuits 22, whereby the control device 11 is operative to perform any of the embodiments of the method 30 as described.

The control device 11 is thus configured to control a power compensation arrangement 1 as has been described. In particular, a power compensation arrangement 1 comprising a voltage source converter 2 and one or more power compensation branches 4, 5, 8, wherein each power compensation branch 4, 5, 8 comprises a thyristor controlled reactor, a thyristor switched reactor and/or a thyristor controlled capacitor. The voltage source converter 2 and the one or more power compensation branches 4, 5, 8 are connected to a same busbar 12. The control device 11 is configured to perform the various embodiments of the method 30 as has been described. In particular, the control device 11 is configured to:

detect a request in an electrical power system 20 to which the power compensation arrangement 1 is connected, determine, based on the request, a need for reactive power supply to the electrical power system 20, provide reactive power by means of the voltage source converter 2 and/or by one or more of the power compensation branches 4, 5, 8, and compensate, by means of the voltage source converter 2, any disturbances caused by the power compensation branches 4, 5, 8 when providing the reactive power to the electrical power system 20.

In an embodiment, the control device 11 is configured to determine the need for reactive power supply to the electrical power system 20 to be larger than a reactive power capacity of the voltage source converter 2, and to provide reactive power by using one or more of the power compensation branches 4, 5, 8 in addition to the voltage source converter 2.

In an embodiment, the control device 11 is configured to minimize the total losses of the power compensation arrangement 1, and to provide reactive power to meet this minimization by using one or more of the power compensation branches 4, 5, 8 in addition to the voltage source converter 2.

In an embodiment, the power compensation branch comprises a thyristor controlled reactor 4 and the control device 11 is configured to compensate disturbances by:

measuring a current $I_{TCR}$ from the thyristor controlled reactor 4, and compensating, based on the measured current $I_{TCR}$, harmonics caused by the thyristor controlled reactor 4.

In an embodiment, the power compensation branch comprises a thyristor switched reactor 8 and the control device 11 is configured to compensate disturbances by:

measuring a current $I_{TSR}$ from the thyristor switched reactor 8, and compensating, based on the measured current $I_{TSR}$, current transients caused by the thyristor switched reactor 8.

In an embodiment, the power compensation branch comprises a thyristor switched capacitor 5 and the control device 11 is configured to compensate disturbances by:

measuring a current $I_{TSC}$ and voltage $U_{C\_TSC}$ of the thyristor switched capacitor 5, and a bus 12 voltage $U_{bus}$, predicting a thyristor switched capacitor 5 current, based on the measured current $I_{TSC}$ and voltages $U_{C\_TSC}$, $U_{bus}$, and based on a switching time instance giving a minimal voltage $U_{C\_TSC}$ of the thyristor switched capacitor 5, and compensating, based on the predicted thyristor switched capacitor 5 current, for the sum of transient currents of the thyristor switched capacitor 5 and the voltage source converter 2.

The present teachings also encompass a computer program 18 for a control device 11 configured to control a power compensation arrangement 1 comprising a voltage source converter 2 and one or more power compensation branches 4, 5, 8, wherein each power compensation branch 4, 5, 8 comprises a thyristor controlled reactor, a thyristor switched reactor or a thyristor controlled capacitor. The voltage source converter 2 and the one or more power compensation branches 4, 5, 8 are connected to a same busbar 12. The computer program 18 comprises computer program code, which, when run on the control device 11 causes the control device 11 to:

detect a request in an electrical power system 20 to which the power compensation arrangement 1 is connected, determine, based on the request, a need for reactive power supply to the electrical power system 20, provide reactive power by means of the voltage source converter 2 and/or by one or more of the power compensation branches 4, 5, 8, and compensate, by means of the voltage source converter 2, any disturbances caused by the power compensation branches 4, 5, 8 when providing the reactive power to the electrical power system 20.

The teachings of the present application also encompasses a computer program product 17 comprising a computer program 18 as described above, and a computer readable means on which the computer program 18 is stored. The computer program product 17 may be any combination of read and write memory (RAM) or read only memory (ROM). The computer program product 17 may also comprise persistent storage, which for example can be any single one or combination of magnetic memory, optical memory or solid state memory.

The computer program product 17, thus comprises instructions executable by the control device 11. Such instructions may be comprised in a computer program 18, or in one or more software modules or function modules. Such functional modules can be implemented using software instructions such as computer program executing in a processor and/or using hardware, such as application specific integrated circuits, field programmable gate arrays, discrete logical components etc.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a control device for controlling a power compensation arrangement comprising a voltage source converter and one or more power compensation branches, each power compensation branch comprising a thyristor controlled reactor, a thyristor switched reactor or a thyristor switched capacitor, the voltage source converter and the one or more power compensation branches being connected to a same busbar, wherein at least one of the one or more power compensation branches comprises a thyristor switched capacitor, the method comprising the steps of:

detecting a request in an electrical power system to which the power compensation arrangement is connected, wherein the request indicates a need of change in reactive power output of the power compensation arrangement;

determining, based on the request, whether the need of change in reactive power output of the power compensation arrangement is larger than a reactive power capacity of the voltage source converter;

providing reactive power by the voltage source converter and by one or more of the power compensation branches when it is determined that the need of change in reactive power output of the power compensation arrangement is larger than the reactive power capacity of the voltage source converter; and compensating, by the voltage source converter, any disturbances caused by the power compensation branches when providing the reactive power to the electrical power system, wherein the compensating of disturbances comprises the steps of:

measuring a current and voltage of the thyristor switched capacitor, and a bus voltage; and compensating, by the voltage source converter, based on the measured current and voltages and a switching time instance giving a minimal voltage of the thyristor switched capacitor, for the sum of transient currents of the thyristor switched capacitor and the voltage source converter.

2. The method as claimed in claim 1, wherein at least one of the one or more power compensation branches comprises a thyristor controlled reactor and the compensating of disturbances comprises the steps of:

measuring a current from the thyristor controlled reactor; and compensating, based on the measured current of the thyristor controlled reactor, harmonics caused by the thyristor controlled reactor.

3. The method as claimed in claim 2, wherein the providing of reactive power comprises a sub-step of determining whether the power compensation branches are available to provide the reactive power and providing the reactive power based on the determination.

4. The method as claimed in claim 2, wherein the request comprises a fault condition, a request from a voltage control, a request from a reactive power control, a request from an operator of the electrical power system or a request based on changes in the electrical power system.

5. The method as claimed in claim 1, wherein at least one of the one or more power compensation branches comprises a thyristor switched reactor, and the compensating of disturbances comprises the steps of:

measuring a current from the thyristor switched reactor; and compensating, based on the measured current of the thyristor switched reactor, current transients caused by the thyristor switched reactor.

6. The method as claimed in claim 5, wherein the providing of reactive power comprises a sub-step of determining whether the power compensation branches are available to provide the reactive power and providing the reactive power based on the determination.

7. The method as claimed in claim 5, wherein the request comprises a fault condition, a request from a voltage control, a request from a reactive power control, a request from an operator of the electrical power system or a request based on changes in the electrical power system.

8. The method as claimed in claim 1, wherein the providing of reactive power comprises a sub-step of determining whether the power compensation branches are available to provide the reactive power and providing the reactive power based on the determination.

9. The method as claimed in claim 8, wherein the request comprises a fault condition, a request from a voltage control, a request from a reactive power control, a request from an operator of the electrical power system or a request based on changes in the electrical power system.

10. The method as claimed in claim 1, wherein the request comprises a fault condition, a request from a voltage control, a request from a reactive power control, a request from an operator of the electrical power system or a request based on changes in the electrical power system.

11. A control device for controlling a power compensation arrangement comprising a voltage source converter and one or more power compensation branches, each power compensation branch comprising a thyristor switched reactor, a thyristor switched reactor or a thyristor controlled capacitor, at least one of the one or more power compensation branches comprising a thyristor switched capacitor, the voltage source converter and the one or more power compensation branches being connected to a same busbar, the control device being configured to:

detect a request in an electrical power system to which the power compensation arrangement is connected, wherein the request indicates a need of change in reactive power output of the power compensation arrangement;

determine, based on the request, whether the need of change in reactive power output of the power compensation arrangement is larger than a reactive power capacity of the voltage source converter;

provide reactive power by the voltage source converter and by one or more of the power compensation branches when the control device determines that the need of change in reactive power output of the power compensation arrangement is larger than the reactive power capacity of the voltage source converter; and compensate, by the voltage source converter, any disturbances caused by the power compensation branches when providing the reactive power to the electrical power system, by:

measuring a current and voltage of the thyristor switched capacitor, and a bus voltage; and compensating, by the voltage source converter, based on the measured current and voltages and a switching time instance giving a minimal voltage of the thyristor switched capacitor, for the sum of transient currents of the thyristor switched capacitor and the voltage source converter.

12. The control device as claimed in claim 11, wherein at least one of the one or more power compensation branches comprises a thyristor controlled reactor and the control device is configured to compensate disturbances by:

measuring a current from the thyristor controlled reactor; and compensating, based on the measured current of the thyristor controlled reactor, harmonics caused by the thyristor controlled reactor.

13. The control device as claimed in claim 11, wherein at least one of the one or more power compensation branches comprises a thyristor switched reactor and the control device is configured to compensate disturbances by:

measuring a current from the thyristor switched reactor; and compensating, based on the measured current of the thyristor switched reactor, current transients caused by the thyristor switched reactor.

14. A computer program for a control device configured to control a power compensation arrangement comprising a voltage source converter and one or more power compensation branches, each power compensation branch comprising a thyristor controlled reactor, a thyristor switched reactor or a thyristor switched capacitor, at least one of the one or more power compensation branches comprising a thyristor switched capacitor, the voltage source converter and the one or more power compensation branches being connected to a same busbar, the computer program comprising computer program code, which, when run on the control device causes the control device to:

detect a request in an electrical power system to which the power compensation arrangement is connected, wherein the request indicates a need of change in reactive power output of the power compensation arrangement;

determine, based on the request, whether the need of change in reactive power output of the power compensation arrangement is larger than a reactive power capacity of the voltage source converter;

provide reactive power by the voltage source converter and by one or more of the power compensation branches when the control device determines that the need of change in reactive power output of the power compensation arrangement is larger than the reactive power capacity of the voltage source converter; and compensate, by the voltage source converter, any disturbances caused by the power compensation branches when providing the reactive power to the electrical power system, by:

measuring a current and voltage of the thyristor switched capacitor, and a bus voltage; and compensating, by the voltage source converter, based on the measured current and voltages and a switching time instance giving a minimal voltage of the thyristor switched capacitor, for the sum of transient currents of the thyristor switched capacitor and the voltage source converter.

15. A computer program product comprising the computer program as claimed in claim 14, and a non-transitory computer readable medium on which the computer program is stored.

* * * * *